April 28, 1970  L. F. KUTIK  3,508,584
SPOOL VALVE
Filed July 31, 1968  4 Sheets-Sheet 1
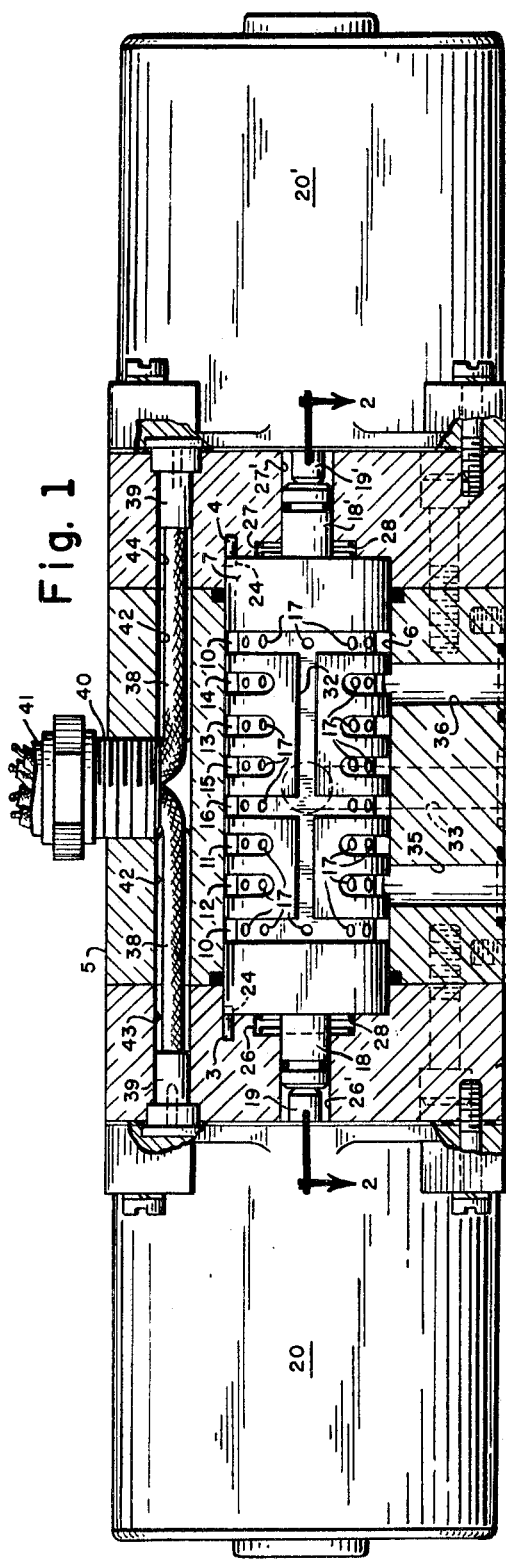
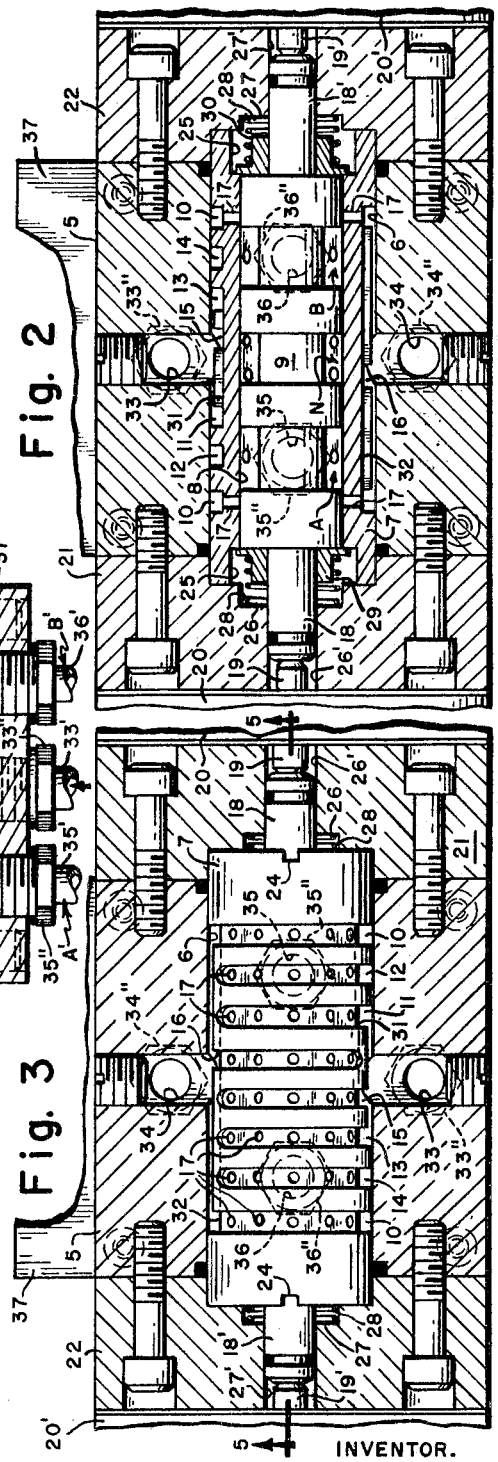
INVENTOR.
LOUIS F. KUTIK
BY James H. Cgles
ATTORNEY April 28, 1970 L. F. KUTIK 3,508,584
SPOOL VALVE Filed July 31, 1968 4 Sheets-Sheet 2

INVENTOR.
LOUIS F. KUTIK

BY *James N. Cyles*

ATTORNEY

April 28, 1970 L. F. KUTIK 3,508,584
SPOOL VALVE
Filed July 31, 1968 4 Sheets-Sheet 3
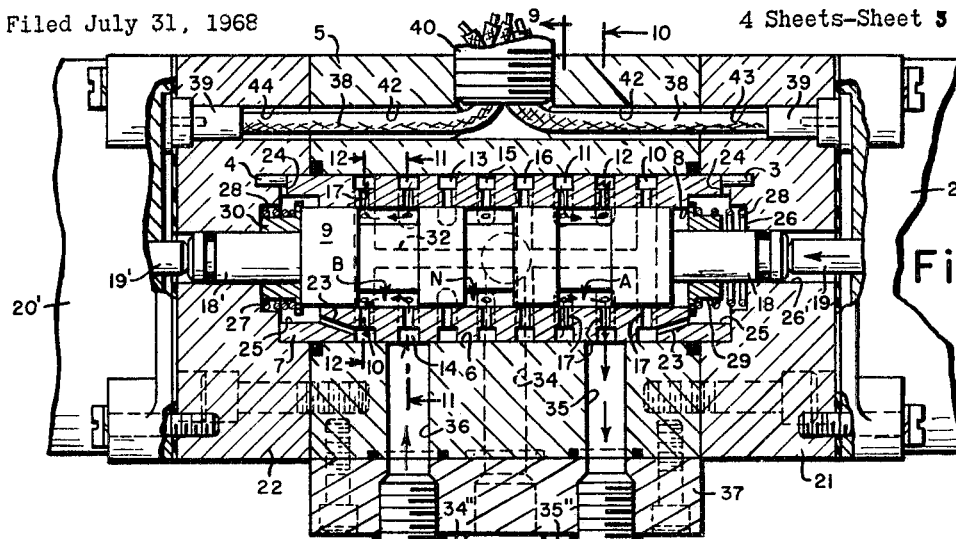
Fig. 8
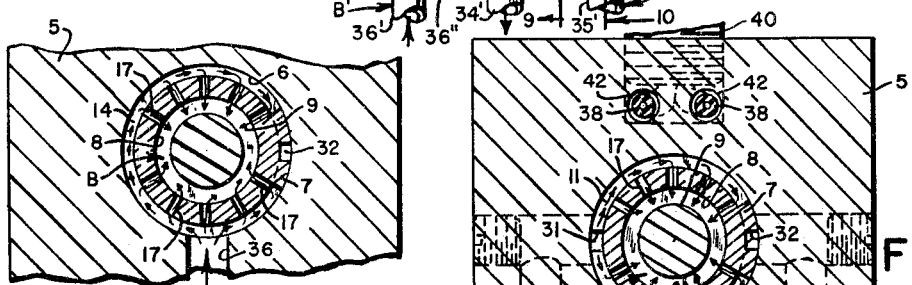
Fig. 11
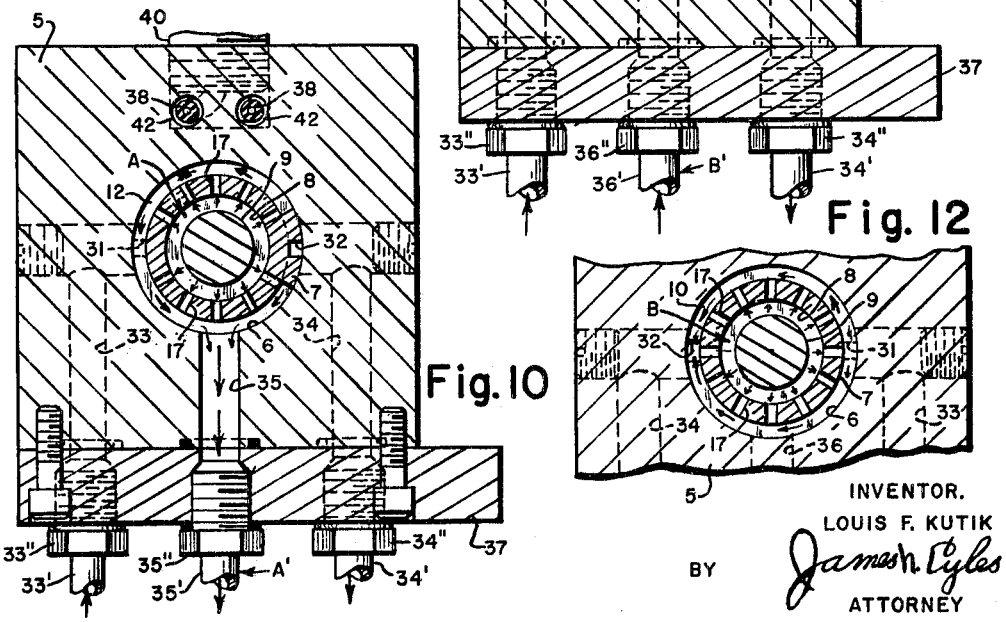
Fig. 9
Fig. 10
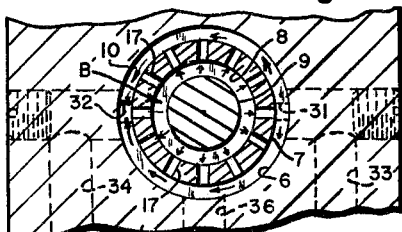
Fig. 12
INVENTOR.
LOUIS F. KUTIK
BY James H. Cyles
ATTORNEY

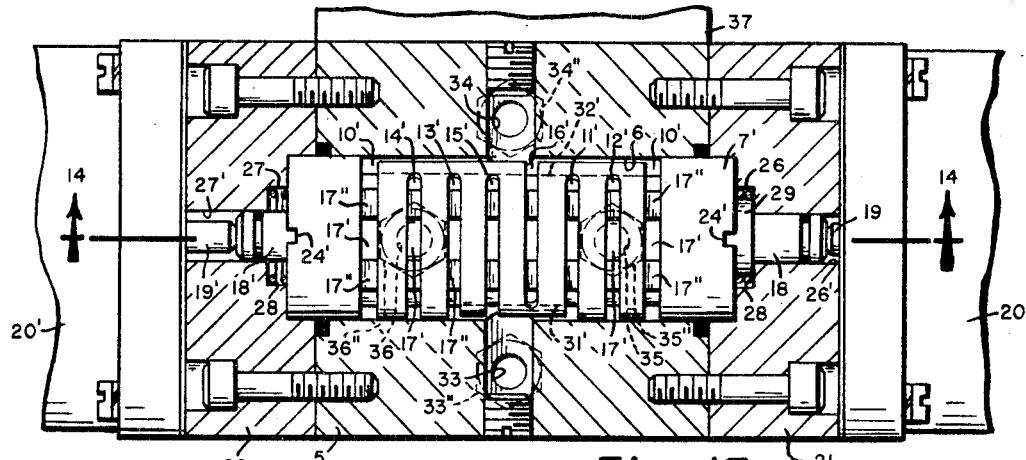
Fig. 13
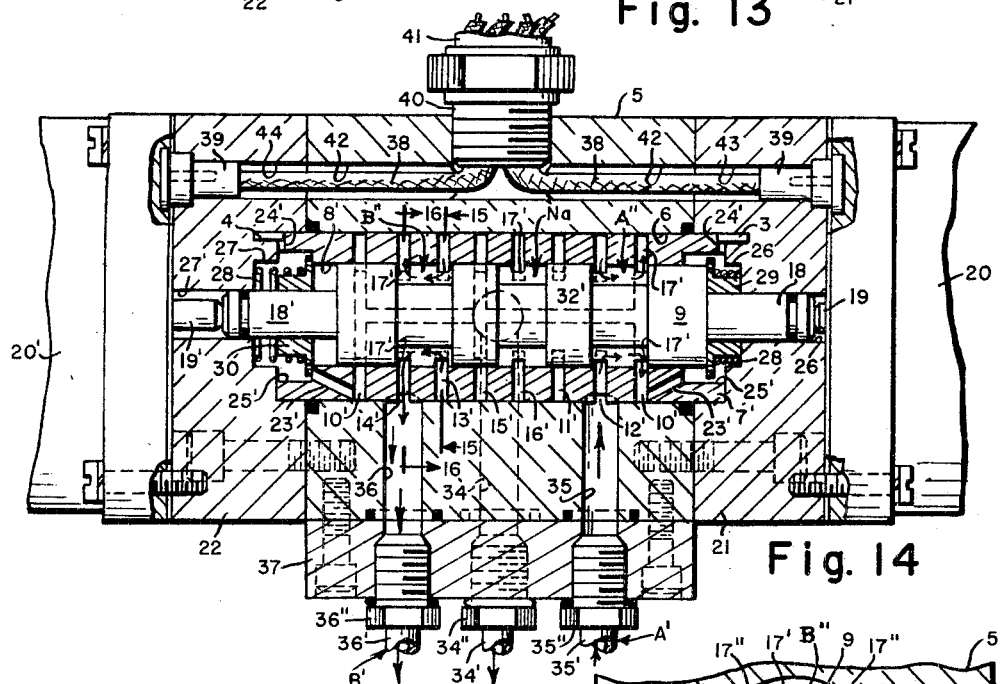
Fig. 14
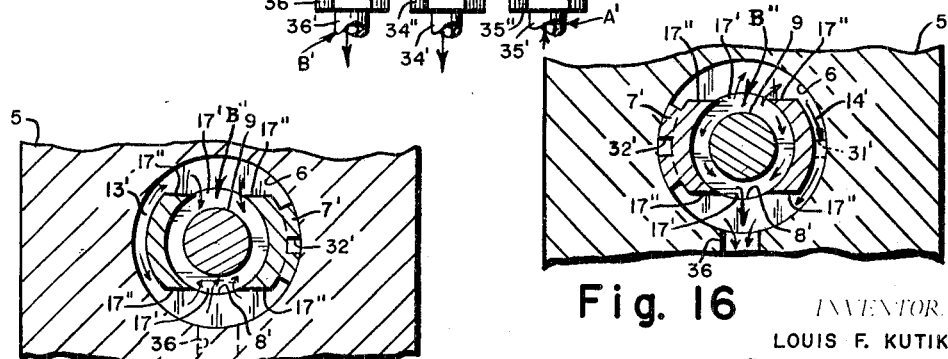
Fig. 15
Fig. 16
INVENTOR.
LOUIS F. KUTIK
BY James N. Cyles
ATTORNEY

United States Patent Office 3,508,584
Patented Apr. 28, 1970

3,508,584
SPOOL VALVE
Louis F. Kutik, 8720 SW. 23rd Place,
Fort Lauderdale, Fla. 33314
Continuation-in-part of application Ser. No. 577,649,
Sept. 7, 1966. This application July 31, 1968, Ser.
No. 756,079
Int. Cl. F16k *11/07*
U.S. Cl. 137—625.64     8 Claims

ABSTRACT OF THE DISCLOSURE

A valve including a housing having a tubular sleeve received in a bore therein and a spool inside the sleeve shiftable axially to control flow of fluid between passages in the housing. The sleeve has two spaced longitudinal grooves recessed from the exterior surface thereof, and a plurality of circumferential grooves, at least some of which extend at least half way around the exterior of the sleeve and communicate with the interior of the sleeve through radial openings therein which provide balanced pressure on the spool. At least one circumferential groove communicates selectively with one of the longitudinal grooves and at least one other circumferential groove communicates selectively with the other longitudinal groove. Other circumferential grooves are provided for different control functions.

---

The application is a continuation in part of my co-pending application Ser. No. 577,649, filed Sept. 7, 1966, now abandoned.

This invention relates to a sleeved spool valve and particularly to the sleeve construction.

Many forms of spool valves are manufactured today using a spool reciprocable in a bore of the housing, the housing having grooves machined into the internal surface of the bore and the grooves having core holes drilled in a housing connecting the grooves with the pressure and return lines of a hydraulic system. As the spool is shifted, the grooves in the spool open or close the grooves on the internal surface of the bore directing the pressurized medium to the desired destination.

One object of the invention is to produce a spool valve with a near perfect balance of pressure force exerted against the spool maintaining a floating condition of the spool and causing it to move freely at all times.

Another object is to produce a valve with most of the precision machining of the valve being done on the outside surface of the sleeve and not on the spool or the internal surface of the core through the housing.

Still another object is to manufacture a spool valve that can be heat treated to suitable hardness on all moving surfaces, extending the life of the moving parts.

Referring specifically to the drawings wherein has been illustrated a preferred form of the device:

FIGURE 1 is a central vertical sectional view of the housing and its associated plates and parts being shown in section with the cylindrical sleeve shown in elevation and with the sleeve being illustrated upon the low pressure side of the cylindrical sleeve;

FIGURE 2 is a central horizontal section taken substantially on line 2—2 of FIGURE 1, through the housing, associated plates and the cylindrical sleeve with the spool shown in elevation; this shows the pressure line and high pressure or intake groove on one side of the sleeve and on the opposite side the low pressure or return groove and the return line connecting to a reservoir not shown;

FIGURE 3 is a horizontal sectional view similar to FIG. 2 but showing the cylindrical sleeve in elevation and view rotated 180 degrees;

FIGURE 8 is a view similar to FIG. 5 showing the inner chamber A in a position which allows fluid to flow, under pressure, to operate a cylinder A' not shown, while the inner chamber B is in a position which allows the flow of fluid, under low pressure, to return to the reservoir from a non-operating cylinder B', also not shown;

FIGURE 9 is a transverse section taken substantially on line 9—9 of FIG. 8 showing the flow of the fluid, under pressure, from the pressure line through the pressure ports to the inner chamber A formed by the inside diameter of the sleeve and the groove of the spool;

FIGURE 10 is a transverse section taken substantially on line 10—10 of FIG. 8 showing the flow of the fluid, under pressure, from the inner chamber A through the cylinder ports and a fluid line to cylinder A', not shown;

FIGURE 11 is a partial transverse section taken substantially on line 11—11 of FIG. 8 showing the flow of the fluid from cylinder B', not shown, through the cylinder ports to inner chamber B;

FIGURE 12 is a partial transverse section taken substantially on line 12—12 of FIG. 8 showing the flow of the fluid from the inner chamber B through the return ports and return line to the reservoir, not shown;

FIGURE 13 is a central horizontal sectional view of the housing and its associated plates being shown in section with the cylindrical sleeve shown in elevation and illustrating a slightly modified form of the invention;

FIGURE 14 is a central vertical section taken substantially on line 14—14 of FIG. 13 showing the inner chamber B" in a position which allows fluid to flow, under pressure, to operate cylinder B', not shown, while the inner chamber A" is in a position which allows the flow of fluid, under low pressure, to return to the reservoir from the non-operating cylinder A' also not shown;

Figure 4:
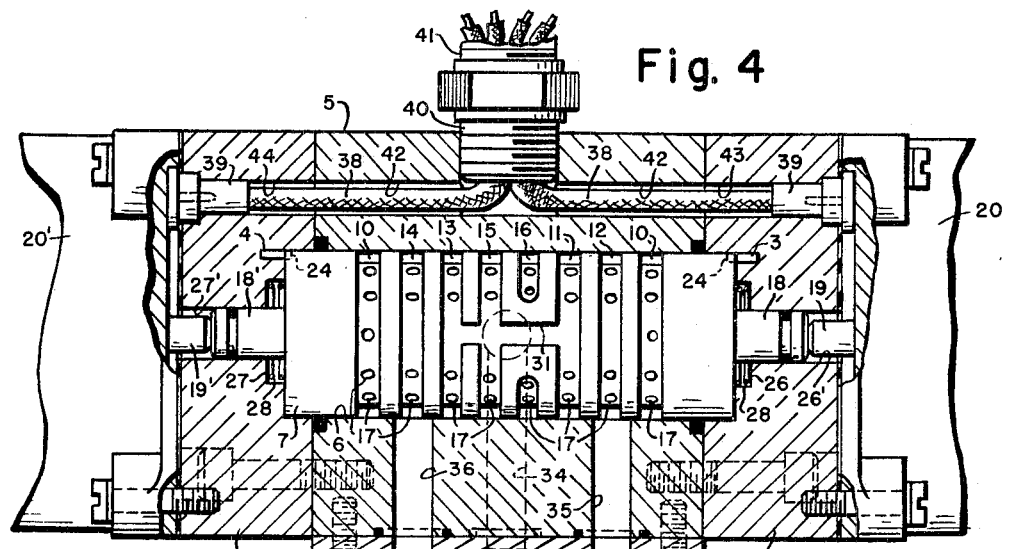
FIGURE 4 is a central vertical sectional view of the housing and its associated plates and parts being shown in section with the cylindrical sleeve shown in elevation; this shows the opposite high pressure side of the cylindrical sleeve.

FIGURE 15 is a partial transverse section taken substantially on line 15—15 of FIG. 14 showing the flow of the fluid, under pressure, from the pressure line through the pressure ports to the inner chamber B" formed by the inside diameter of the sleeve and the grooves of the spool, and FIGURE 16 is a partial transverse section taken substantially on line 16—16 of FIG. 14 showing the flow of the fluid, under pressure, from the inner chamber B" through the cylinder ports and a fluid line to cylinder B', not shown.

Referring first to FIGURES 1–7, the valve includes a housing 5 having a cylindrical bore 6 extending completely through it, and a tubular sleeve 7 fitting within the bore 6. The sleeve 7 has a cylindrical internal bore 8, and inside this bore is a spool 9 which is shiftable axially in both directions, the spool being shown in these figures in a neutral position.

The opposite end faces of the housing 5 are covered by end plates 21 and 22 which are recessed at 26 and 27 to receive the ends of the sleeve 7. The ends of the sleeve are notched at 24 to receive pins 3 and 4 which are rigidly affixed in end plates 21 and 22 respectively so as to lock the sleeve 7 in a stationary position.

Figure 5:
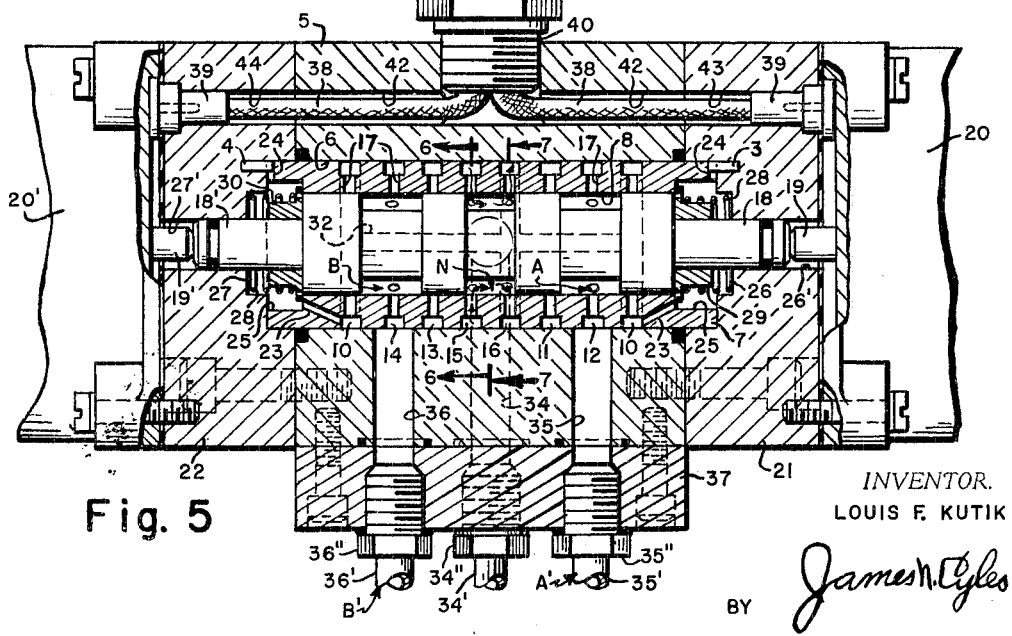
FIGURE 5 is a central vertical section taken substantially on line 5—5 of FIG. 3 showing the inner chamber N in a neutral position allowing fluid, under pressure, to flow into it through the pressure ports and flow out through the return ports and return line to the reservoir, not shown.

Attached to end plate 21 by suitable screws is a first solenoid 20, and affixed to end plate 22 by suitable screws is a second solenoid 20'. These solenoids respectively include push rods 19 and 19' which engage axial extensions 18 and 18' of the spool 9. The extensions 18 and 18' fit slidably in bores 26' and 27' in end plates 21 and 22 respectively. Solenoid 20 may be energized to extend push rod 19 and thereby push spool 9 to the right as viewed in FIGURE 1, and conversely, solenoid 20' may be energized to extend push rod 19' and thereby push spool 9 to the left as viewed in FIGURE 1. It should be noted that FIGURES 3, 4 and 5 are reversed as compared to FIGURES 1 and 2. The spool 9 is held in the neutral position by two springs 28 at opposite ends thereof received respectively in recesses 26 and 27 and bearing against stop collars 29 and 30. The stop collars are received in internal end recesses 25 in the sleeve 7 and butt against the ends of the sleeve.

The exterior surface of the sleeve 7 is cylindrical, and a plurality of grooves are formed in this surface. There is a longitudinally extending groove 31 on one side of the sleeve, and another longitudinally extending groove 32 on the opposite side of the sleeve, these grooves being most clearly visible in FIGURES 4 and 1 respectively. Groove 31 is an intake groove which communicates with an intake passage 33 extending vertically in the housing 5. Groove 32 is a return groove communicating with a return passage 34 extending vertically in the housing 5. An intake line 33' is connected by a coupling nut 33" to the intake passage 33 and is also connected to a source of fluid under high pressure, not shown. A return line 34' is connected by a coupling nut 34" to return passage 34 and is also connected to a low pressure fluid reservoir, not shown. In the operation of the valve, as will be explained in more detail later, fluid may be supplied from the high pressure source through conduit 33' and passage 33 to the valve, and returned through passage 34 and conduit 34' to the low pressure fluid reservoir. This occurs when the spool 9 is in the neutral position.

The spool 9 has four lands and three grooves forming a central chamber N and two side chambers A and B. The central chamber N allows flow of fluid between the source of high pressure fluid and the reservoir of low pressure fluid when the spool 9 is in the neutral position. The side chamber A allows flow of fluid from the high pressure source of fluid to a cylinder designated A' (but not shown) when the solenoid 20 is energized. The chamber B allows flow of fluid from the source of high pressure fluid to a cylinder designated B' (but not shown) when the solenoid 20' is energized. The operation of the valve will be described in more detail later.

As shown in FIGURES 1, 4 and 5, there is an output passage 35 communicating with the cylinder A' via a conduit 35' which is connected to passage 35 by a coupling nut 35". There is another output passage 36 in housing 5 communicating with cylinder B' via conduit 36' which is connected to passage 36 by a coupling nut 36". The coupling nuts are all secured to a connection plate 37 which is attached to the bottom of the housing 5 by suitable screws.

A pair of electrical conductors 38 are connected to the two solenoids 20 and 20' by connectors 39, and these conductors 38 enter the housing 5 through a threaded coupling 40 and a tube 41. The conductors 38 pass through apertures 42 in housing 5 and apertures 43 and 44 in end plates 21 and 22.

The exterior surface of the tubular sleeve 7 has a plurality of control grooves formed therein extending circumferentially about the sleeve. There are two control grooves 10 at the opposite ends of the sleeve which communicate with the return longitudinal groove 32 as shown in FIGURE 1. The control grooves 10 extend completely around the circumference of the sleeve, but it may be seen in FIGURE 4 that the control grooves 10 do not communicate with the intake longitudinal groove 31. As shown in FIGURE 5, two diagonally extending ports 23 extend between control grooves 10 and the recessed surfaces 25 of sleeve 7. If any fluid leaks around the periphery of the sleeve 7 during the operation of the valve, the fluid collects in the recessed surfaces 25 and flows through ports 23 to the control groove 10. From grooves 10, this fluid flows via return groove 32 to the low pressure return passage 34 to the low pressure fluid reservoir, not shown. Thus, there is no build up of high pressure fluid in the valve due to leakage.

The other circumferential control grooves formed in the exterior surface of the sleeve 7 are designated 11, 12, 13, 14, 15 and 16. From FIGURE 5 it may be seen that all of these control grooves 10–16 inclusive communicate with the interior of the sleeve 7 through radial apertures or openings 17 extending through the sleeve to the interior thereof. A plurality of these openings 17 are provided for each of the control grooves and the illustrated embodiment, but it would only be essential to have two such apertures located diametrically opposite each other so that the fluid in the grooves would exert balanced pressure on the spool 9. Because of this balancing of pressure, due to the spacing of the apertures 17 or equivalent apertures, the spool 9 is caused to float in the bore 8 and thus can move axially freely.

It may be noted on a comparison of FIGURES 1, 3 and 4 that control grooves 11–16 inclusive extend more than half way around the circumference of the sleeves 7 but not all the way around the sleeve. Control grooves 11, 13 and 15 communicate with the intake longitudinal groove 31 (see FIGURE 4) but terminate short of the return longitudinal groove 32 (see FIGURE 1). On the other hand, control groove 16 communicates with the return groove 32 (see FIGURE 1) but terminates short of the intake groove 31. Control grooves 12 and 14 communicate with the output passages 35 and 36, and do not communicate with either the intake groove 31 nor the return groove 32 on the exterior of the sleeve 7. The control grooves 12 and 14, on the other hand, can communicate with the control grooves 11 and 13 respectively via the interior of the sleeve 7 when the spool 9 is shifted to appropriate positions as will be explained further.

OPERATION OF THE VALVE AS SHOWN IN FIGURES 1–7

Figures 6, 7:
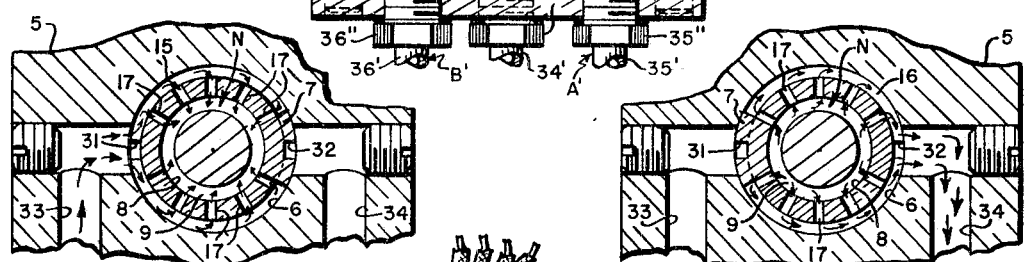
FIGURE 6 is a partial transverse section taken substantially on line 6—6 of FIG. 5 showing the flow of the fluid, under pressure, from the pressure line through the pressure ports to the inner chamber N formed by the inside diameter of the sleeve and the groove of the spool.
FIGURE 7 is a partial transverse section taken substantially on line 7—7 of FIG. 5 showing the flow of the fluid from the inner chamber N through the return ports and return line to the reservoir, not shown.

With the spool 9 in the neutral position where it is shown in FIGURES 1–7, the valve serves to direct fluid from the inlet passage 33 to the return passage 34 so that fluid merely circulates from the source of fluid to the fluid reservoir without requiring that any pumps be shut off. This circulation of fluid can be seen most clearly in FIGURES 6 and 7. The sectional views shown in FIGURES 6 and 7 are taken along lines 6—6 and 7—7 of FIGURE 5. It should be understood that lines 6—6 and 7—7 indicate staggered cuts through the valve. Thus, in FIGURE 6, the section is taken through sleeve 7 at groove 15, and the bottom and sides of FIGURE 6 are staggered so as to show the inlet and return passages 33 and 34. Likewise in FIGURE 7, the section is taken through sleeve 7 along groove 16, and the bottom and sides of FIGURE 7 are staggered so as to show the inlet and return passages 33 and 34.

Fluid under high pressure enters the valve through conduit 33' and passage 33 and flows into the intake longitudinal groove 31 as shown in FIGURE 6. The fluid is distributed in groove 15, and flows through apertures 17 to the chamber N formed on the interior of sleeve 7 by the spool. As shown in FIGURE 7, this fluid flows out of chamber N to groove 16 via the apertures 17 and from there to the return longitudinal groove 32 which communicates with return passage 34. The fluid then flows through the low pressure reservoir via conduit 34', the reservoir not being shown.

It may be noted in FIGURE 5 that the two central lands on the spool 9 block the fluid from leaving the central chamber N. Also, these two lands close the grooves 11 and 13 so that no fluid can flow into chambers A and B.

OPERATION OF VALVE WITH SOLENOID 20 ENERGIZED

FIGURES 8–12 inclusive show the operation of the valve when the solenoid 20 is energized. It may be seen in FIGURE 8 that the spool 9 has been moved to the left so that groove 16 is now blocked, thus preventing fluid from flowing from groove 15 to groove 16. Groove 13 is also blocked so that no fluid can enter the sleeve through this groove. However, groove 11 now communicates with chamber A through the radial openings 17, and output groove 12 also communicates with chamber A through other openings 17. As shown in FIGURE 9, fluid flows in through conduit 33' and input passage 33 to the intake longitudinal groove 31 and to control groove 11. This fluid flows through apertures 17 to the chamber A on the interior of the sleeve 7. As shown in FIGURE 10, the same fluid flows out from chamber A to groove 12 through other radial apertures 17, and flows from groove 12 to the output passage 35 which communicates with a cylinder A' via conduit 35'. Thus, the spool 9 directs the flow of fluid from inlet passage 33 to out put passage 35.

With solenoid 20 operated, the spool 9 also serves another control function as shown in FIGURES 8, 11 and 12. Referring first to FIGURE 8, it may be seen that output groove 14 is in communication with return groove 10 via chamber B. As shown in FIGURE 11, any fluid in output passage 36 can flow through groove 14 into chamber B via radial openings 17. As shown in FIGURE 12, this same fluid can flow out from chamber B through radial openings 17 to groove 10. The fluid flows from groove 10 to longitudinal groove 32, and from there to return passage 34 which is coupled to a low pressure reservoir via conduit 34'. Thus, the output cylinder B' connected to conduit 36' is kept at low pressure when the solenoid 20 is operated.

MODIFIED EMBODIMENT AND OPERATION THEREOF

FIGURES 13–16 inclusive show a modified embodiment of the invention which is very similar to the embodiment of FIGURES 1–12, the only difference being that instead of a plurality of small radial apertures 17 being provided in the sleeve 7, a pair of radial apertures 17' (see FIGURES 15 and 16) are provided at opposite sides of each of the grooves 10', 11', 12', 13', 14', 15' and 16'. The sleeve 7 has flat surfaces 17" adjoining the radial openings 17' as shown in FIGURES 15 and 16. The remaining construction of the valve of FIGURES 13–16 is identical to that of FIGURES 1–12, and like reference numerals are used for the same parts except that prime marks have been added to some of the reference numerals. For example, the chambers formed by the spool 9 are designated A", B" and Na.

It should be noted that in FIGURES 13–16, the spool 9 is shown in a position shifted to the right relative to its neutral position since it is assumed that the solenoid 20' has been energized. In this position, the valve serves to direct fluid from the intake passage 33 to the output passage 36. The valve also serves to connect the output passage 35 with the return passage 34.

Referring to FIGURES 13 and 14, fluid flows in through intake passage 33 and from there to the intake longitudinal groove 31. This fluid flows into the control groove 13 and from there through radial openings 17' to the inner chamber B" as shown in FIGURE 15. Referring now to FIGURE 16, it may be seen that this same fluid flows from chamber B" out via radial passages 17' to control groove 14' and from there out through outlet passage 36 to the cylinder B' which is not shown.

At the same time, any fluid in output passage 35 can flow into groove 12' and from there into chamber A" within sleeve 7 as shown in FIGURE 14. This same fluid can flow out via radial openings 17' into groove 10' which communicates with the longitudinal return groove 32'. The fluid flows from return groove 32' through the return passage 34 to the low pressure reservoir which is not shown. Thus, while the valve is directing fluid from the input passage 33 to the output passage 36, it is also establishing the other output passage 35 in communication with the return passage 34. At the same time, any fluid which leaks around the outside of the sleeve 7 to the spaces at the end of the sleeve can flow through ports 23' to the grooves 10' and from there via longitudinal groove 32' to the return passage 34 which communicates with the low pressure reservoir.

SUMMARY

The invention provides a valve including a sleeve mounted in a bore in a housing and a spool inside the sleeve which is shiftable to control the flow of fluid between passages provided in the housing. Grooves are formed in the exterior surfaces of the sleeve, and these grooves communicate with the interior of the sleeve via radial openings. The spool has lands and grooves which opens selected ones of the control grooves and block other ones of the grooves depending upon the position of the spool. All precision machining is done on the exterior surface of the sleeve rather than on the interior surface of the housing, and it is much easier and less expensive to accomplish such exterior machining. Also, the sleeve can be removed easily and replaced with another sleeve or simply repaired and put back in the housing if this is necessary. The circumferential control grooves formed in the sleeve extend at least half way around the sleeve, and some of these grooves communicate with one longitudinal groove while others communicate with a different longitudinal groove. Since the control grooves extend more than half way around the sleeve, radial openings through the sleeve communicating with the grooves and the interior of the sleeve may be located on opposite sides of the sleeve to provide balanced pressure on the spool so that it floats in the sleeve and can be moved easily. This is a definite advantage in the functioning of the valve.

Having thus described my invention, I claim:

1. In a valve comprised of a housing having a tubular sleeve received in a bore therein and a spool inside the sleeve shiftable axially thereof to control flow of fluid between passages in the housing, the improvements wherein said sleeve has a cylindrical exterior surface with a plurality of grooves therein including (1) a first longitudinal groove extending longitudinally of said sleeve and communicating with one of said passages, (2) a second longitudinal groove extending longitudinally of said sleeve and spaced circumferentially from said first groove, said second longitudinal groove communicating with another of said passages, (3) a first circumferential groove communicating with said first longitudinal groove and extending circumferentially more than half way around said sleeve but terminating short of said second longitudinal groove, and (4) a second circumferential groove communicating with said second longitudinal groove and extending more than half way around said sleeve but terminating short of said first longitudinal groove, said circumferential grooves communicating with the interior of said sleeve through radial openings therein providing balanced pressure on said spool, and said spool having land and groove portions for directing flow through said circumferential grooves.

2. A valve as claimed in claim 1 in which said sleeve further includes a third circumferential groove in said cylindrical surface communicating with said first longitudinal groove and extending circumferentially more than half way around said sleeve, and a fourth circumferential groove communicating with one of said passages and extending circumferentially more than half way around said sleeve, said third and fourth grooves communicating with the interior of said sleeve through radial passages therein providing balanced pressure on said spool.

3. A valve as claimed in claim 2 in which said second longitudinal groove extends to the positions of said third and fourth grooves but said third and fourth grooves terminate short of said second longitudinal groove.

4. A valve as claimed in claim 3 in which said cylindrical surface includes at least one additional circumferential groove communicating with said second longitudinal groove and the interior of said sleeve, said additional groove having no communication with said first longitudinal groove and extending circumferentially more than half way around said sleeve.

5. A valve as claimed in claim 4 in which said additional groove communicates with said fourth circumferential groove only when said spool is shifted axially to a predetermined position.

6. In a valve comprised of a housing having a tubular sleeve received in a bore therein and a spool inside the sleeve shiftable axially thereof to control flow of fluid from an input passage in the housing to at least one of a plurality of other passages, the improvements wherein said sleeve has a cylindrical exterior surface with a plurality of grooves therein including (1) an input groove extending longitudinally of said sleeve and communicating with said input passage, (2) a return groove extending longitudinally of said sleeve and spaced circumferentially from said input groove, said return groove communicating with a return passage in said housing, (3) a first control groove extending from said input groove circumferentially more than half way around said sleeve but terminating short of said return groove, (4) a second control groove extending from said return groove circumferentially more than half way around said sleeve but terminating short of said input groove, and (5) a plurality of additional circumferential control grooves at least one of which communicates with said input groove and at least one of which communicates with an output passage in said housing, said additional control grooves extending circumferentially more than half way around said sleeve, each of said control grooves communicating with the interior of said sleeve through radial openings therein providing balanced pressure on said spool, and said spool having land and groove portions for directing flow of fluid from said inlet groove through selected ones of said control grooves.

7. A valve as claimed in claim 6 in which said additional grooves have no communication with said return groove, but said return groove extends to the positions of said additional grooves.

8. A valve claimed in claim 7 in which said cylindrical surface includes a further control groove extending from said return groove circumferentially more than half way around said sleeve but free of communication with said input groove, said further groove communicating through the interior of said sleeve with the one of said additional grooves communicating with said output passage only when said spool is shifted to a predetermined position.

References Cited

UNITED STATES PATENTS

| | | | |
|---|---|---|---|
| 1,395,756 | 11/1921 | McReynolds et al. | 137—625.69 |
| 2,605,079 | 7/1952 | Miller et al. | 137—625.64 |
| 2,924,239 | 2/1960 | Bjorklund | 137—625.69 |
| 2,987,050 | 6/1961 | Oppenheimer et al. | 137—625.69 XR |
| 2,997,065 | 8/1961 | Johnson | 137—625.69 |
| 3,152,614 | 10/1964 | Carls | 137—625.69 |
| 3,253,617 | 5/1966 | Beckett | 137—625.69 |

M. CARY NELSON, Primary Examiner

R. J. MILLER, Assistant Examiner

U.S. Cl. X.R.

251—282